US008619628B2

(12) United States Patent  (10) Patent No.: US 8,619,628 B2
Tessier et al.  (45) Date of Patent: Dec. 31, 2013

(54) ENHANCED RELIABILITY ROUTING PROTOCOL

(75) Inventors: Olivier Tessier, Asnières sur Seine (FR); Frédéric Perez, Voisins le Bretonneux (FR)

(73) Assignee: Thales, Neuilly sur Seine (FR)

(*) Notice: Subject to any disclaimer, the term of this patent is extended or adjusted under 35 U.S.C. 154(b) by 324 days.

(21) Appl. No.: 12/973,364

(22) Filed: Dec. 20, 2010

(65) Prior Publication Data

US 2011/0317710 A1  Dec. 29, 2011

(30) Foreign Application Priority Data

Dec. 21, 2009  (FR) ...................................... 09 06215

(51) Int. Cl.
   *H04L 12/28*  (2006.01)
(52) U.S. Cl.
   USPC ............................ 370/254; 370/401; 709/220
(58) Field of Classification Search
   USPC ......... 370/389, 400, 401, 254, 255, 351, 406; 709/220–224
   See application file for complete search history.

(56) References Cited

U.S. PATENT DOCUMENTS 6,069,895 A   5/2000   Ayandeh

FOREIGN PATENT DOCUMENTS

EP   1189384   3/2002
WO   2008055539   5/2008

*Primary Examiner* — Man Phan
*Assistant Examiner* — Mandish Randhawa
(74) *Attorney, Agent, or Firm* — Baker & Hostetler LLP

(57) ABSTRACT

In a method of enhanced reliability routing within a system including one or more networks having several nodes connected together by communication means, the system using a link-state routing protocol constructing the topology of the nodes within a system of nodes, the routing method determines the logical topology of network interconnection nodes NIN by using modules which perform the following: discovery of the neighborhood by functions of the physical networks; smoothing of the information provided by TNAs to improve the stability of the protocol; distributing the neighborhoods to the set of NINs; relaying of the information associated with a node by a subset of the NIN node; hop by hop enhancement of the reliability of the transmission between various nodes; transmission in point-to-multipoint mode; announcement of oriented characteristics of logical links solely by the source routers of the links; marking of the signaling data so as to manage non-sequencing in reception; and calculation of the global topology.

17 Claims, 11 Drawing Sheets

Sig_Neighbourhood of 1 equals:
{(1<->2 / C), (1<->3 / B), (1<->4 / B), (1<->5 / A)}

Sig_Neighbourhood of 1 transmitted to 2, i.e. Sig_Neighbourhood_Transmitted[2](1)
= {(1<->5 / A), (1<->3 / B), (1<->4 / B)}

Sig_Neighbourhood_Transmitted[3](1)
= {(1<->5 / A)}

Sig_Neighbourhood_Transmitted[4](1)
= {(1<->5 / A), (1<->2 / C), (1<->3 / C)}

Sig_Neighbourhood_Transmitted[5](1)
= {(1<->2 / C), (1<->3 / C), (1<->3 / B), (1<->4 / B)}

⇒ For each of the neighbours of 1, the Sig_Neighbourhood_Transmitted is different. Knowing whether the transmission will be more optimal by despatching 4 messages (1/recipient) or just 1 message containing the concatenation of the neighbourhood transmitted (which equals Sig_Neighbourhood) is not within the remit of FIRE. Only the FORWARDER knows which is the best output network (e.g. to reach 3) and only the TNAs know whether the network is a point-to-point, broadcast or other network.

⇒ FIRE forms a message which it gives to the FORWARDER (fc. NIN_TOPO_06):
Part 1 = {(1<->5 / A)}, destinations = 2, 3, 4
Part 2 = {(1<->2 / C), (1<->3 / C)}, destinations = 4, 5
Part 3 = {(1<->3 / B), (1<->4 / B)}, destinations = 2, 5

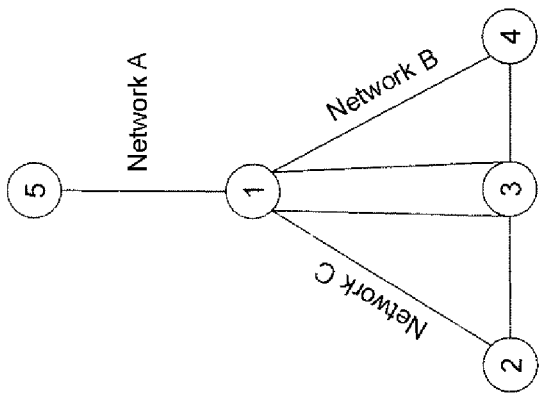

FIG.6

Reconstruction of Sig_neighbourhood(1) at the level of 3:

- Sig_neighbourhood_Transmitted(1) received by 3:
  = {(1<->5 / A)}

- Local information:

- Topology provided by network B: (1,3), (1,4), (3,4)
  => (1<->3 / B) and (1<->4 / B) must appear in Sig_neighbourhood (1)

- Topology provided by network C: (1,2), (1,3), (2,3)
  => (1<->2 / C) and (1<->3 / C) must appear in Sig_neighbourhood (1)

=> Sig_neighbourhood (1) therefore equals:
  {(1<->5 / A), (1<->3 / B), (1<->4 / B), (1<->2 / C), (1<->3 / C)}

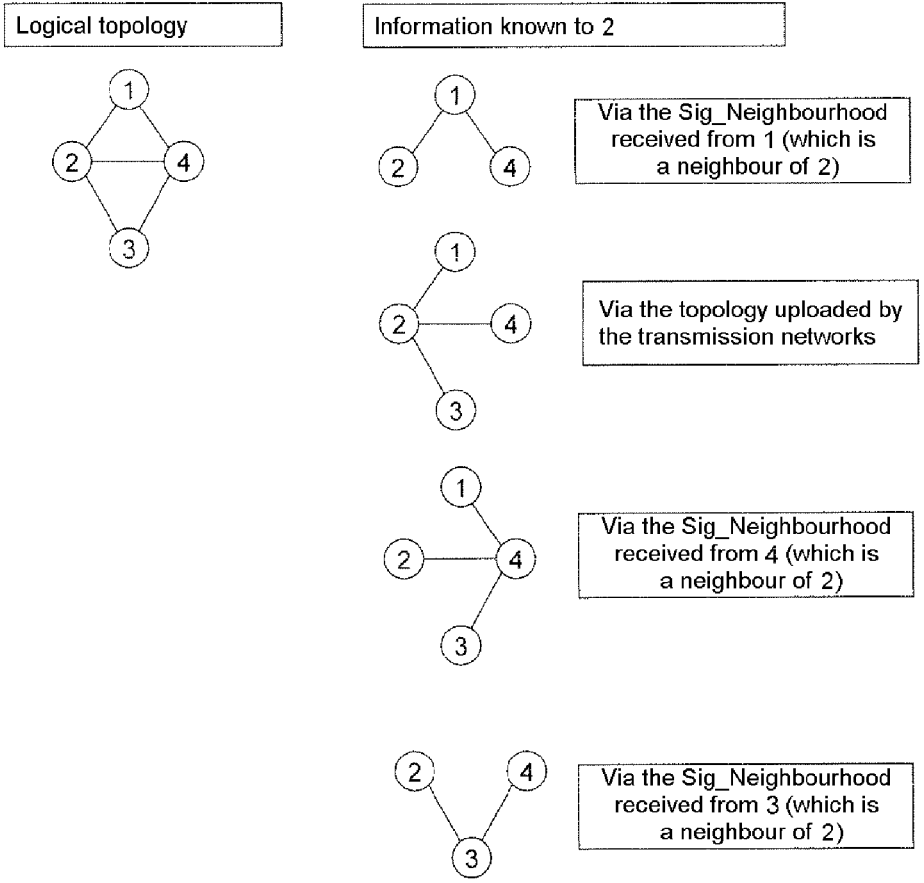

Process of auto-election of the relays of Sig_Neighbourhood of node 1

2 sees 1, 3 and 4 as neighbours. It must verify the neighbourhoods
of 1 and of 3 to know whether it must relay for the pairs (1<->3), (1<->4) and (3<->4)
3 is not in the neighbourhood of 1 => 2 is potential relay between (1<->3).
4 is in the neighbourhood of 1 => 2 does not need to relay for the pair (1<->4)
4 is in the neighbourhood of 3 => 2 does not need to relay for the pair (3<->4)
⇨ 2 is potential RSN for (1<->3)
⇨ By symmetry, 4 is also potential RSN for (1<->3)
To have just one RSN, only the node which has the smallest index is chosen RSN.
=> 2 is RSN for the pair (1<->3)

FIG.10

| Logical topology | Relays of Sig_Neighbourhood |
|---|---|
| 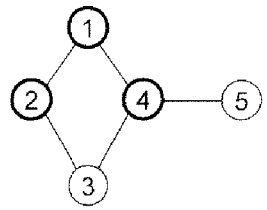 | 1 is RSN of (2<->4)<br>2 is RSN of (1<->3)<br>4 is RSN of (1<->5) & (3<->5)<br>NB. An RSN never despatches a Sig_Neighbourhood to the origin node or a neighbour of the origin node (if it is aware of one).<br>eg: even if 2 is RSN for (1<->3), if it receives from 1 a Sig_Neighbourhood(3), 2 does not relay this Sig_Neighbourhood to 3. |

| Distribution of a Sig_Neighbourhood generated by 3 | Distribution of a Sig_Neighbourhood generated by 5 |
|---|---|
| 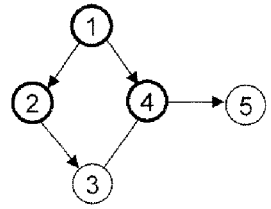 | 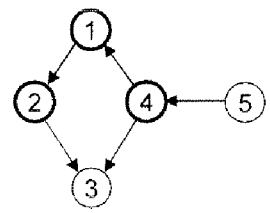 |
| | NB. 3 receives Sig_Neighbourhood(5) twice. When the topology is known, the despatching of 2 to 3 is unnecessary, but 2 has only a partial view: its relaying from 1 to 3 is systematic. In fact, if 4 were RSN of (1<->3), the distribution would be optimal. Here we see a case of sub-optimality of the algorithm. |

| Distribution of a Sig_Neighbourhood generated by 3 | Distribution of a Sig_Neighbourhood generated by 2 and 4 |
|---|---|
| 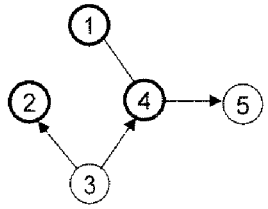 | 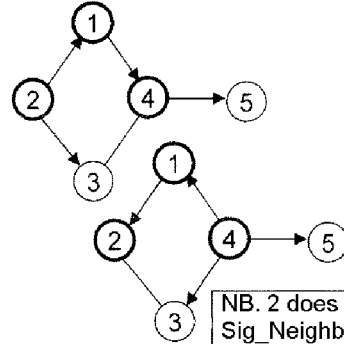 |
| NB. 1 does not relay Sig_Neighbourhood (3) between 2 and 4 since 2 knows that 4 is a neighbour of 3. | NB. 2 does not relay Sig_Neighbourhood (4) between 1 and 3 since 2 knows that 3 is a neighbour of 4. |

FIG.12

| Distant_neighbourhood_Table |||||
|---|---|---|---|---|
| Origin node | Sequence index | LPHR [sender neighbours (i.e. that have received the sig_neighbourhood of the origin node)] | LANH [receiver neighbours that have acknowledged] | Content of the Sig_neighbourhood ||
| | | Node | Node | Node | Transmission network |
| | | | | | |
| | | | | | |
| | | | | | |
| | | | | | |

FIG.13

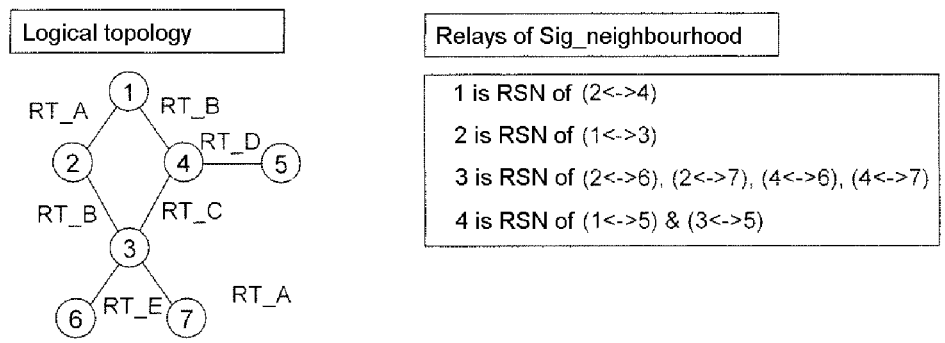

Logical topology

Relays of Sig_neighbourhood 1 is RSN of (2<->4)
2 is RSN of (1<->3)
3 is RSN of (2<->6), (2<->7), (4<->6), (4<->7)
4 is RSN of (1<->5) & (3<->5)

Example of Distant_neighbourhood_Table of node 3

| Distant_neighbourhood_Table |||||
|---|---|---|---|---|
| Origin node | Sequence index | LPHR [sender neighbours (i.e. that have received the sig_neighbourhood of the origin node)] | LANH [receiver neighbours that have acknowledged] | Content of the Sig_neighbourhood ||
| | | Node | Node | Node | Transmission network |
| 1 | SN_10 | 2 | 6,7 | 2 | RT_A |
| | | | | 4 | RT_B |
| 2 | SN_8 | 2 | 6(1) | 1 | RT_A |
| | | | | 3 | RT_B |
| 4 | SN_9 | 4 | 6,7 | 1 | RT_B |
| | | | | 3 | RT_C |
| | | | | 5 | RT_D |

(1) 7 has not yet acknowledged the Sig_neighbourhood(2) of sequence index SN_8.
(2) No Sig_neighbourhood of 5, 6 and 7 is received by 3 (optimization of the Sig_neighbourhood_Transmitted)

FIG.14

ENHANCED RELIABILITY ROUTING PROTOCOL

CROSS-REFERENCE TO RELATED APPLICATION

This application claims priority to foreign French patent application No. FR 09 06215, filed on Dec. 21, 2009, the disclosure of which is incorporated by reference in its entirety.

FIELD OF THE INVENTION

The subject of the invention relates to a method of dynamic routing or routing protocol used in the field of low throughput networks operating in the 30 MHz-600 MHz bracket. The method according to the invention is used, for example, on nodes interconnecting several different physical networks, some of which are low throughput and high latency, such as VHF (Very High Frequency) radio networks. The protocol according to the invention or method of routing may be used in any UHF, VHF or other transmission network.

BACKGROUND OF THE INVENTION

In the technical field of communication networks, one of the problems which arises is to find mechanisms for exchanges between routers which are at one and the same time reactive and economical as regards bandwidth used. The difficulty consists in fact in rapidly establishing the topology of the routers, both in the setup phase and in the phase of modifying the components of the network (disappearance, appearance of routers, change of network hookup of the routers), while not flooding the networks with protocol exchanges which may consume a significant part of the available bandwidth.

The state of the art known by the Applicant in this regard relates notably to routing protocols used on the Internet protocol (IP for short) which are defined for example in the RFCs (Requests for Comment) which are a set of documents which make reference to the Internet Community and which describe, specify, aid the implementation, standardize and debate the majority of the standards, norms, technologies and protocols related to the Internet and to networks in general. Among these documents may be cited the experimental protocols defined within the framework of the working groups on mobile networks or Mobile Ad Hoc Networks known to specialists in the Field, or else the standard protocols used for interconnections of wire-based networks.

Despite the effectiveness of these protocols, the tactical-network interconnection topologies currently known in the military field exhibit notably the drawback of exhibiting redundancy of the nodes between networks and of networks between nodes, thereby generating an increase in protocol exchanges.

In the case of low throughput networks (from 1 Kbit/s to a few tens of Kbits/s), the existing protocols known to the person skilled in the art are not designed to optimize the reduction in the quantity of protocol information exchanged, necessary for correct operation of low throughput networks. These protocols in general therefore saturate the bandwidth of VHF radio networks and to a lesser extent that of UHF networks. Likewise, the disregard of the concepts of parallel or redundant networks between nodes gives rise to avalanche phenomena in certain protocols, thereby causing significant traffic.

The protocols mentioned hereinabove do not therefore make it possible to achieve economy of bandwidth. Moreover, the risk of a high rate of losses of potential packets is disregarded by the existing protocols. These protocols do not therefore make it possible to obtain fast convergence while exchanging a small quantity of information.

Patent application WO 2008/055539 discloses a multi-domain network in which each domain of the network collects intra-domain routing information and generates a reduced view of this information available to the other domains of the network.

The following definitions will be used herein:

Waveform: Set consisting of a logical and physical layer making it possible to dispatch information remotely, wirelessly. This includes the coding of the information on the radio pathway as well as the media access protocols and optionally the internal routing protocols.

Wire medium: Set consisting of a logical and physical layer making it possible to dispatch information remotely, by wire.

Physical medium: Generic term designating a waveform or a wire medium.

Transmission network: Pair (physical medium, configuration elements) allowing all the possessors of a given pair to potentially communicate with one another. Such a possessor is called a member of the network.

Elementary network: Set of members of a transmission network which are adjoining at an instant t.

Forwarder: Function whose role is to relay data between local applications and elementary networks, and between elementary networks. The "forwarder" is charged with finding the next NIN or the local application to which to dispatch the data; the associated task is called "forwarding."

NIN: Network Interconnection Node. Designates any functional entity ensuring the functions necessary for the transmission of data from and to one or more elementary networks.

Transmission network access (TNA): which is charged with transmitting on a physical medium the data to the next NIN.

Adaptation layer: charged with supplementing the services offered by the physical medium, and/or with carrying out the functional adaptations between the services required by the FORWARDER and those offered by the physical medium.

TNA: allows the NIN node to dispatch/receive data over/from the corresponding physical network.

Neighbourhood (of an NIN N): Set of NINs which are reachable by N by traversing one and only one elementary network.

Sig_Neighbourhood: FIRE signalling message which chiefly contains the Neighbourhood of an NIN.

Relay of Sig_Neighbourhood (RSN): NIN which must relay Sig_Neighbourhoods between certain of its neighbours.

SUMMARY OF THE INVENTION

The routing protocol according to the invention includes at least four principles:
1) the recovery of the media topologies;
2) enhanced reliability of broadcasting;
3) management of recipient nodes and not of output interfaces; and
4) relevant sending of information (no sending of information known by the neighbour nodes).

These principles will be explained further on in the description. The word method or the expression "FIRE protocol", or else "protocol", will be used to designate one and the same object, namely the method of enhanced reliability routing according to the invention.

The invention relates to a method of enhanced reliability routing within a system comprising one or more networks composed of several nodes connected together by communication means, the said system comprising a transmission network access or TNA charged with transmitting on a physical medium the data to a next network interconnection node NIN, the said system using a link-state routing protocol constructing the topology of the nodes within a system of nodes, characterized in that the said routing method determines the logical topology of network interconnection nodes NIN used in combination the following modules:

Module 11 NIN_TOPO_01: Discovery of the Neighbourhood by virtue of the intrinsic functions of the physical networks;

Module 12: NIN_TOPO_02 FIG. 5: Smoothing of the information provided by the TNAs to improve the stability of the protocol;

Module 13: NIN_TOPO_03: Principle of distributing the neighbourhoods to the set of NINs;

Module 14: NIN_TOPO_04: Relaying of the information associated with a node (neighbours, links and their characteristics) Sig_Neighbourhoods by a subset of the NIN nodes (relay of Sig_Neighbourhoods)

Module 15 NIN_TOPO_05: Hop by hop enhancement of reliability of the transmission of the Sig_Neighbourhoods between the various nodes;

Module 16 NIN_TOPO_06: Transmission of the Sig_Neighbourhoods in point-to-multipoint mode;

Module 17 NIN_TOPO_07:

Announcement of the oriented characteristics of the logical links solely by the source routers of the links;

Module 18 NIN_TOPO_08: Marking of the signalling data so as to manage non-sequencing in reception; and Module 19: NIN_TOPO_09: Calculation of the global topology.

BRIEF DESCRIPTION OF THE DRAWINGS

Other characteristics and advantages of the invention will become more readily apparent by reading the following detailed description given by way of nonlimiting illustration, together with the figures, in which:

FIG. 6 is an example of distribution of the parameters associated with an NIN node;

FIG. 10 is an exemplary potentially RSN node;

FIG. 12 is an exemplary relaying of Sig_Neighbourhood;

FIG. 13 is an exemplary format of a table of neighbours for a node; and

FIG. 14 is an example of neighbourhood signalling tables.

DETAILED DESCRIPTION

In the following detailed description of exemplary embodiments of a dynamic method of enhanced reliability routing according to the invention, the following apply:

HYP_TOPO_1: The choice of the best route between a source 'S' and a destination 'D' for a data packet 'P' depends on several criteria. These criteria are hereinafter referred to as "routing criteria."

HYP_TOPO_2: For a route between a source 'S' and a destination 'D' for a data packet 'P', the value of each criterion can depend:

on the nature and the state of the links traversed (a link is a logical connection between 2 nodes), on the characteristics and the state of the relay nodes traversed, on the parameters characterizing the data packets to be forwarded.

The routes depending on numerous criteria (HYP_TOPO_1), there exists a very large number of possible routes, each being the 'best' for a packet having given characteristics. The solution adopted for the protocol according to the invention is to use a link-state routing protocol, which constructs the topology of the nodes; the best route for the data packets being calculated thereafter locally on each of the nodes.

The method according to the invention or FIRE will calculate the logical topology of the NIN nodes within a system of NIN nodes. In this logical topology of the NIN nodes, two NIN nodes A and B are connected together directly, if there exists an elementary network to which node A and node B belong, independently of the number of physical hops between A and B within the elementary network.

This topology must have the following characteristics (HYP_TOPO_2):

the topology must be represented in the form of a graph of NIN nodes connected by symmetric links (for transmission)

each node of the graph possesses:
an identifier,
the radio silence state,
transit capacity (may be dependent on the power supply, on the wish to favour local streams, on static rules, etc.),
a list of the services relayable by the node, each link of the graph possesses:
a locally unique identifier,
parameters dependent on the class of the transmission network (a class groups together a set of values of the parameters of the network, values fixed by configuration)
a list of the services supported,
absolute maximum size of the data supported,
recommended maximum size of the data supported,
the list of authorized security levels,
a list of the types of content (content_type) nominally authorized,
a list of the authorized types of content in backup route,
parameters dependent on the information uploaded by the Transmission Network Access (TNA)

throughput of the link between the source and the end of the link (information dependent on the direction of the link), mean access time, state of the link in terms of transmission: reliable, unstable, unknown.

These characteristics will be used as routing criteria.

Figure 1:
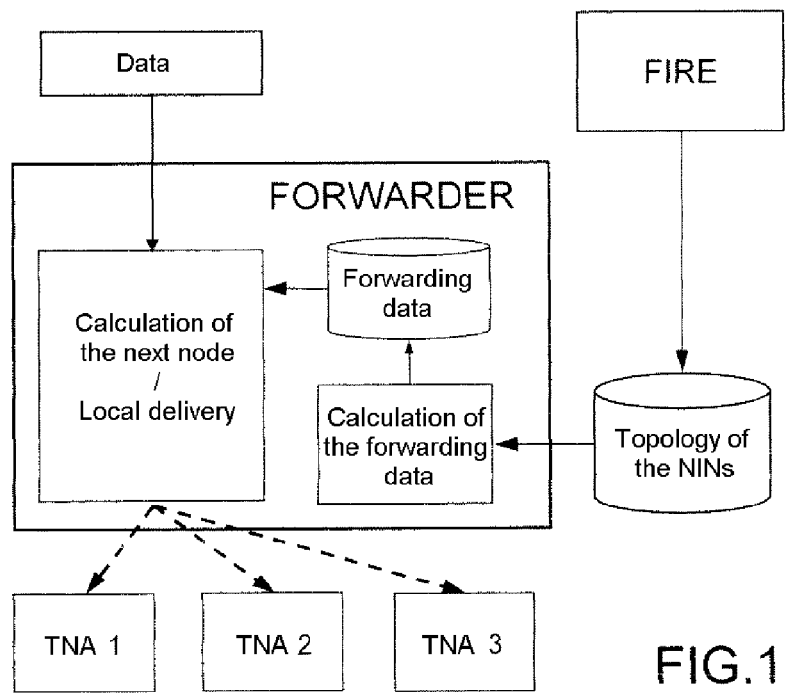
FIG. 1 is an exemplary link between the enhanced reliability radio topology function or FIRE according to the invention and the transmission data (forwarding)
Figure 2:
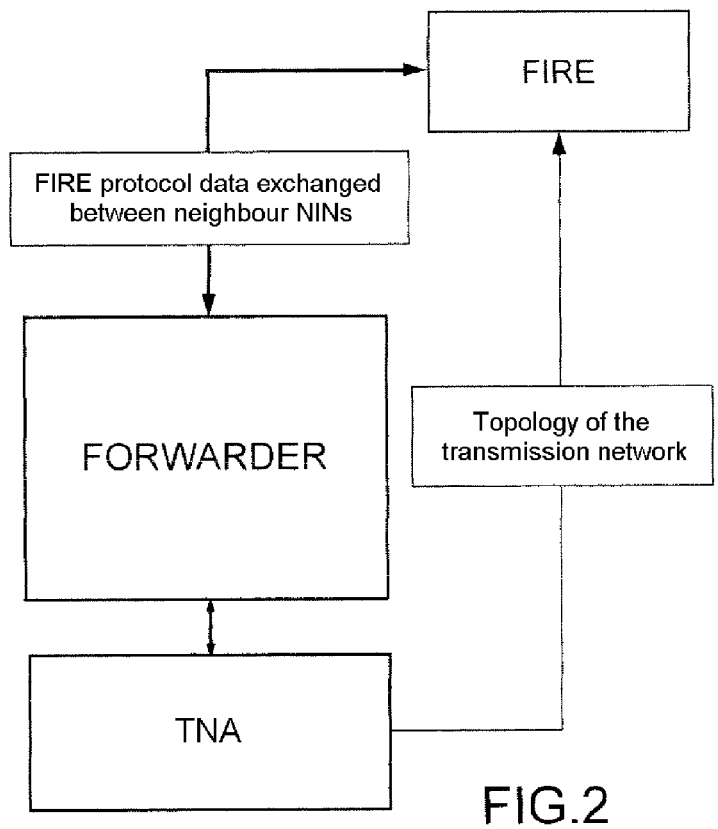
FIG. 2 is an example of the data used to calculate the topology of the network interconnection nodes.

FIG. 1 shows diagrammatically the links between the enhanced reliability radio topology function according to the invention and the Forwarding data. To calculate the topology of the NINs, FIRE relies on 2 types of data as is represented in FIG. 2:

the data exchanged with the other FIRE entities, the information received from the Transmission Network Accesses.

Principles of a Link-state Protocol

So-called "link-state" protocols make it possible to establish a topology of routers (or NINs, according to the terminology employed), each router running an instance of the protocol. The operation of the inter-network routing protocols with state of links can amount to the following main mechanisms:

P1—Neighbourhood discovery: each router discovers, on each network on which it is interconnected, its neighbours with which it has a symmetric connection (it receives data from a neighbour and this neighbour receives its data). For a given network, the set of neighbours accessible by this network is denoted "network neighbourhood". The set of network neighbourhoods of a router is called a Neighbourhood.

P2—communication of the Neighbourhood: each router communicates its neighbourhoods to all the other routers. NB. In certain cases, only a subset of the routers communicate their neighbourhood.

P3—calculation of the global topology: each router, on the basis of the various neighbourhoods received, constructs the global topology.

These main mechanisms are supplemented with the secondary mechanisms, whose objective is that of:

S1—enhancing the reliability of the neighbourhood discovery,

S2—enhancing the reliability of the communications of the neighbourhoods,

S3—dealing with the non-sequencing in reception of the neighbourhoods received (and for example not overwriting a recent item of information with an obsolete item of information). Makes it possible to manage the restarts ("reboots") of machines and the transmission delays in the system.

The definition and the settings of the main and secondary mechanisms is done so as to optimize two contradictory criteria:

C1: the bandwidth consumed by the exchanges of the routing protocol,

C2: the reactivity of the protocol (initial convergence, update subsequent to a change of the topology of the routers).

While also complying with a 3$^{rd}$ criterion:

C3: minimum scheduling (few configuration data).

One of the objectives of the protocol is to have high reactivity with low consumed bandwidth. This may be represented by a high ratio C2/C1, while complying with C3.

List of the Main Mechanisms of the Enhanced Reliability Radio Topology Function (FIRE) Implemented in a Method According to the Invention The following paragraphs will exhibit the mechanisms adopted for the function for establishing the topology of the NINs. They are identified by a prefix 'FIRE_' followed by a 2-digit index (e.g.: FIRE_04). The requirements on a mechanism are denoted by FIRE_XX/YYY where YYY is the requirement index, customarily incremented from 10 in 10 s, this merely being a nonlimiting example.

Figure 5:
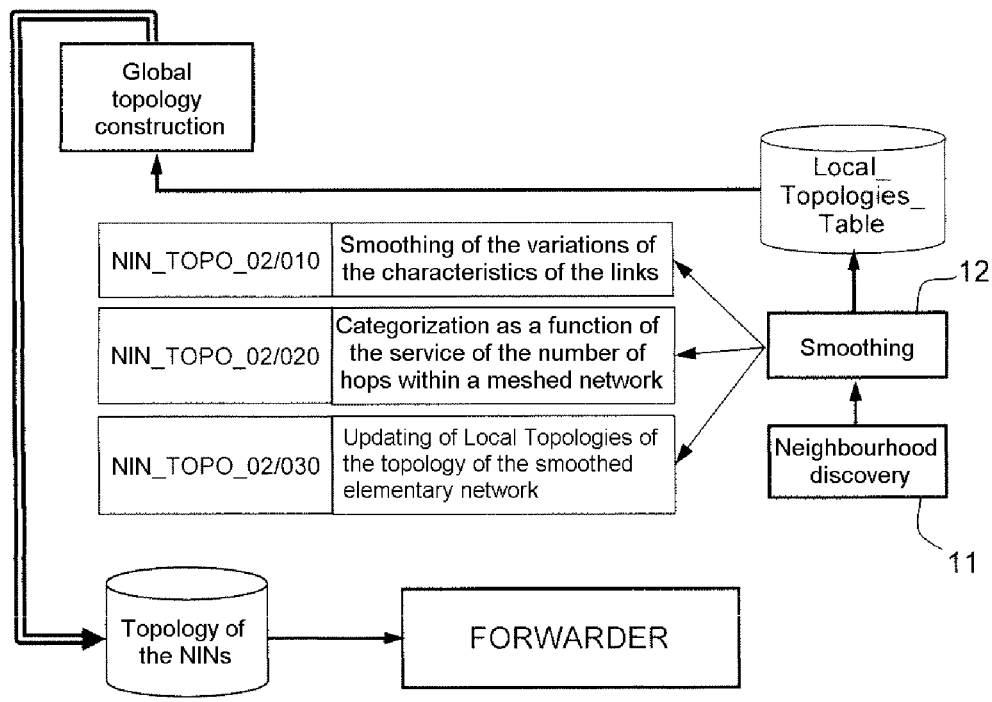
FIG. 5 is a representation of the mechanism for smoothing the information provided by the TNAs.

These mechanisms are 9 in number:

11: Module 11 NIN_TOPO_01: Discovery of the Neighbourhood by virtue of the intrinsic functions of the physical networks Module 12: NIN_TOPO_02 FIG. 5: Smoothing of the information provided by the TNAs to improve the stability of the protocol 13: Module 13: NIN_TOPO_03: Principle of distributing the neighbourhoods to the set of NINs 14: Module 14: NIN_TOPO_04: Relaying of the Sig_Neighbourhoods by a subset of the NIN nodes (relay of Sig_Neighbourhoods)

15: Module 15 NIN_TOPO_05: Hop by hop enhancement of reliability of the transmission of the Sig_Neighbourhoods 16: Module 16 NIN_TOPO_06: Transmission of the Sig_Neighbourhoods in point-to-multipoint mode 17: Module 17 NIN_TOP_07:

Announcement of the oriented characteristics of the logical links solely by the source routers of the links 18: Module 18 NIN_TOP_08: Marking of the signalling data so as to manage non-sequencing in reception 19: Module 19: NIN_TOPO_09: calculation of the global topology The mechanisms interact according to the mechanisms described in FIG. 3, these mechanisms being detailed as they arise in the description.

Figure 4:
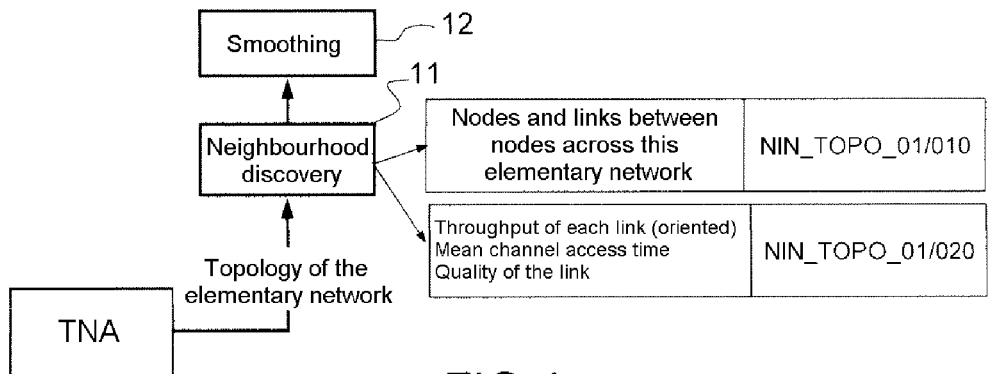
FIG. 4 is a description of the neighbourhood discovery mechanism.

Discovery of the Neighbourhood FIG. 4

Module 11 NIN_TOP_01: Discovery of the Neighbourhood by Virtue of the Intrinsic Functions of the Physical Networks The transmission module or "FORWARDER" of an NIN node interconnects physical networks. The technologies of these physical networks being very different in nature (throughput, lags, losses, etc.), the FORWARDER relies on the transmission networks to calculate its neighbourhood information, which explains the requirement hereinafter.

NIN_TOPO_01/010

Each access to a Transmission Network TNA of the NIN node must provide the protocol according to the invention with the topology of the elementary network of which it forms part. This topology must contain the description of a graph of nodes having the following properties:

Each node represents an NIN or a transmission relay

Each link is a symmetric link, in the sense of the possibility of transmission. For a given node, each end of the link must be able to transmit to the other link.

The NIN address to connection address resolution function and the reciprocal function being ensured by the TNA, the topology provided contains addresses of NIN nodes and not connection addresses (specific to the transmission network). A node of the graph of the elementary network has no NIN address when this node represents a transmission relay with no node function.

NIN_TOP_01/010 suffices to ascertain the neighbour NINs (in the logical sense) and the number of physical hops within the transmission network between 2 NINs. However, a further item of information is desirable for correctly estimating the quality of the network connection between 2 NINs.
NIN_TOPO_01/020

When the TNA provides an elementary network topology to FIRE, it must provide, if the technology of the transmission network so allows, the following complementary information:

Throughput of each link, with orientation of the link in the case of non-symmetric throughputs, Mean access time to the physical channel of each link, Quality of each link: good, average, bad, deduced, for example from the information provided by the modem situated in the Physical Medium, therefore below the TNA.

Module 12: NIN_TOPO_02 FIG. 5: Smoothing of the Information Provided by the TNAs to Improve the Stability of the Protocol To economize on the bandwidth consumed by the inter-NIN topology signalling on radio transmission networks, the dispatches of signalling data cannot be too frequent. In fact, it is not desirable (nor even beneficial) to announce to the other NINs 'in real time' the changes of the characteristics of the links or of internal topology that are provided by a TNA.

The information provided by the TNAs must therefore be processed before being passed on to the other nodes, so as to ensure a certain stability of the information dispatched and of the resulting topology.

The first processing relates to the characteristics of the links between nodes:
NIN_TOPO_02/010

According to the dynamic characteristics of the transmission networks, the protocol according to the invention FIRE must smooth certain variations of the characteristics of the links before including them in the neighbourhood broadcast to the other nodes.

The second processing relates to the internal topology of the networks:
NIN_TOPO_02/020

To manage the meshed networks and smooth the evolution of their topology, the protocol according to the invention will rank the numbers of hops into 3 categories (close, medium, distant) with a hysteresis to enter and exit each category as a function of the number of real hops. This categorization depends on the type of service to be made to transit through the transmission network.

Finally, so that the neighbourhoods can be dispatched to the neighbour NINs "nominatively", FIRE must update and provide the 1-hop topology to the FORWARDER.
NIN_TOPO_02/030

Figure 3:
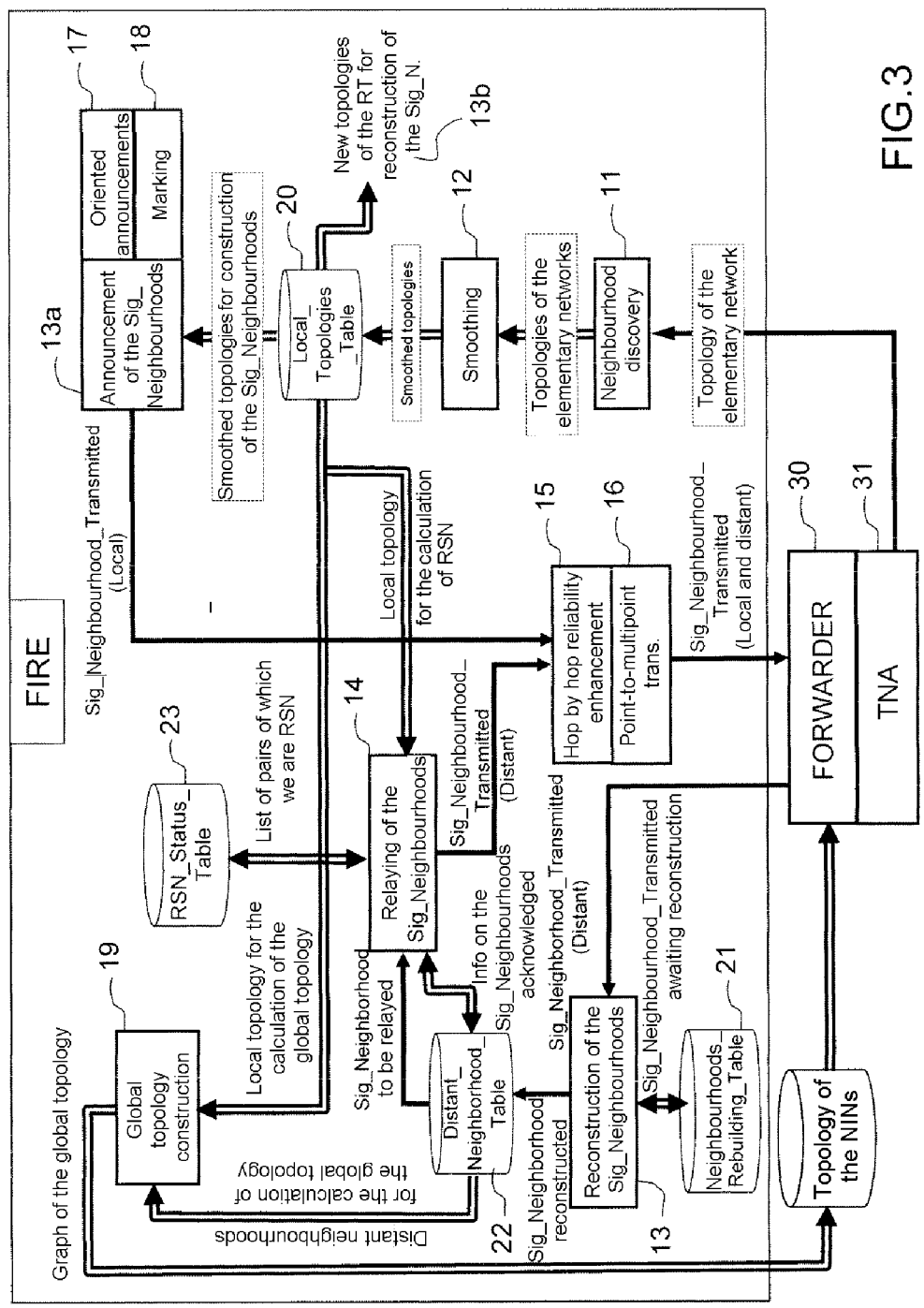
FIG. 3 is an exemplary functional architecture of the method according to the invention.

On receipt of a topology of an elementary network, and once the smoothing operation has been performed (NIN_TOPO_02/020), the method according to the invention will save the smoothed topology in a Local_Topology_Table table, 20 FIG. 3.

When Local_Topologies_Table is modified, then the function for constructing the graph recalculates the graph and thereafter updates the topology of the NINs.
Module 13: NIN_TOPO_03 FIGS. 6, 7, 8 Principle of Distributing the Neighbourhoods to the Set of NINs So that each NIN can construct the complete topology of the network, it is necessary and sufficient to ascertain the set of neighbours of each NIN and the characteristics of the links between each NIN and its neighbours. The basic principle is therefore that each NIN announces to all the other NINs these data (neighbours, links and their characteristics), which will be dubbed Sig_Neighbourhood.

To optimize this broadcast:

each NIN dispatches its Sig_Neighbourhood to its neighbours, nominatively (and not by flooding on the local interfaces), this dispatching is carried out in an optimized manner, by removing the information known to the receivers, each NIN reconstitutes the complete Sig_Neighbourhoods on reception, a relay sub-graph is established and only these relays are in charge of redistributing the Sig_Neighbourhoods received to the other NINs, the enhancement of reliability of all these dispatches is not done by systematic repetition, but by acknowledgements and retransmission, performed by the protocols of the lower layers (FORWARDER, TNA, etc.)

during the distribution of a Sig_Neighbourhood to NINs on an elementary network, a single point-to-multipoint dispatching is requested of the FORWARDER, in place of multiple point-to-point dispatches, the characteristics dependent on the direction of the link are announced only by the NIN which is the source of the oriented link.

NIN_TOPO_03a: Optimized Dispatching of the Sig_Neighbourhoods to the Neighbours

NIN_TOPO_03/010

On each new elementary network topology received, the protocol according to the invention FIRE must construct the set of the following elements, called Sig_Neighbourhood:

The unscheduled properties of the local NIN node, if such exists (transit capacity, services that can be relayed, etc.)

The list of neighbour NINs accessible by any elementary network $R_E$, for each neighbour NIN, $NIN(R_E)$ The identification of the transmission network of which $R_E$ forms part (i.e through which the neighbour NIN is accessible, there exists a global identification of each transmission network:

The unscheduled properties of the neighbour NIN, if such exists,

The unscheduled properties of the link to this neighbour, if such exists (e.g.: throughput, quality of the link in terms of transmission)

The CRC calculated on the previous values

The sequence index of this Sig_Neighbourhood, calculated according to the requirements NIN_TOPO_08/010.

Thereafter if first_new_topology=TRUE then FIRE must set max_waiting_for_new_network_topology_timer (on starting FIRE, first_new_topology must be initialized to TRUE). This timer corresponds to the maximum waiting time for new topologies of elementary networks originating from the TNAs, once the first topology has been received; its objective is to avoid the transmission of too many Sig_Neighbourhoods during the instability phases.

Next the FIRE protocol must reset the timer waiting_for_new_network_topology_timer. This timer corresponds to the waiting time for a new topology of an elementary network; being systematically reset, it is the timer max_waiting_for_new_network_topology_timer which avoids a perpetual wait; and finally The FIRE protocol must toggle first_new_topology to FALSE. This state variable is used to launch the timer max_waiting_for_new_network_topology_timer only on receipt of the first new topology of a "burst".

For example, a VHF or UHF radio network is intrinsically identified by the parameters which allow its members to communicate (keys, frequency, etc.). The grouping of these parameters into a short unique identifier (1 to 2 bytes) makes it possible to broadcast the intrinsic properties of the network, while consuming less bandwidth than if the exhaustive list of the values of its parameters were broadcast. On the other hand, the membership of the NINs in a network is broadcast and not known by scheduling. It is not used to deduce connectivity information therefrom but for information regarding characterizations of the links (used for multi-criterion routing). In fact, splitting the transmission networks into several elementary networks has no impact on the operation of the routing protocol.

The objective of the timers present in NIN_TOPO_010 is to avoid transmitting information immediately after indication of a new topology of a transmission network. It is particularly useful during the phases of startup, of arrival in a new network, etc. when the topologies of transmission networks change rapidly. After receipt of a change of topology following a stable state, at the maximum at the end of the global timer max_waiting_for_new_network_topology_timer, the Sig_Neighbourhood is dispatched.

The CRC contained in a Sig_Neighbourhood allows the neighbours receiving the latter to verify that the reconstruction of the Sig_Neighbourhood complies with the initial Sig_Neighbourhood.

NIN_TOPO_03/020

On expiry of max_waiting_for_new_network_topology_timer or of waiting_for_new_network_topology_timer, the FIRE protocol must provide Sig_Neighbourhood to the Sig_Neighbourhood_Transmitted construction function defined by NIN_TOPO_03/030, and set first_new_topology to TRUE.

The requirement NIN_TOPO_03/010 constructs the whole of the neighbourhood of a node N, independently of the recipient neighbour. Now, for a given neighbour Ni, this neighbourhood contains information that Ni already knows, such as the links N<->Ni. To avoid transmitting information that is non-relevant on the networks, FIRE calculates for each neighbour Ni a lightened Sig_Neighbourhood, denoted by Sig_Neighbourhood_Transmitted[Ni].

NIN_TOPO_03/030, FIG. 6

When the FIRE protocol dispatches a local Sig_Neighbourhood (module 13a FIG. 3) to neighbours Ni, it must determine which information of this Sig_Neighbourhood is already known by each neighbour Ni (e.g.: connectivity via radio, measurement of the throughputs). It must thereafter deduct them from Sig_Neighbourhood to form a lightened Sig_Neighbourhood denoted by Sig_Neighbourhood_Transmitted[Ni].

FIRE must thereafter dispatch these Sig_Neighbourhood_Transmitted[Ni] according to the requirement NIN_TOPO_06/010 described hereinafter.

These processings make it possible to decrease the size of Sig_Neighbourhood transmitted to each neighbour. As the sequence index is known only to the local node, it must necessarily be dispatched. At the minimum, a Sig_Neighbourhood_Transmitted[Ni] is reduced to the sequence index. It should be noted that Sig_Neighbourhood_Transmitted is generally different according to the neighbour to which Sig_Neighbourhood ought to be dispatched.

For example, for a set of nodes connected solely to a single elementary network $R_E$, each node not having any dynamic characteristics: Sig_Neighbourhood amounts to the sequence index and to the information uploaded by the TNA of $R_E$, and Sig_Neighbourhood_Transmitted comprises solely the sequence index (known solely to the sender) and the value of the CRC (calculated on the initial information, and which allows the receiver to ensure that the reconstitution that it does complies with the origin).

This optimization makes it possible to drastically decrease the quantity of protocol traffic in the case of the redundant inter-NIN links, which may be created either by redundant networks between nodes, or by redundant nodes between networks.

Figure 7:
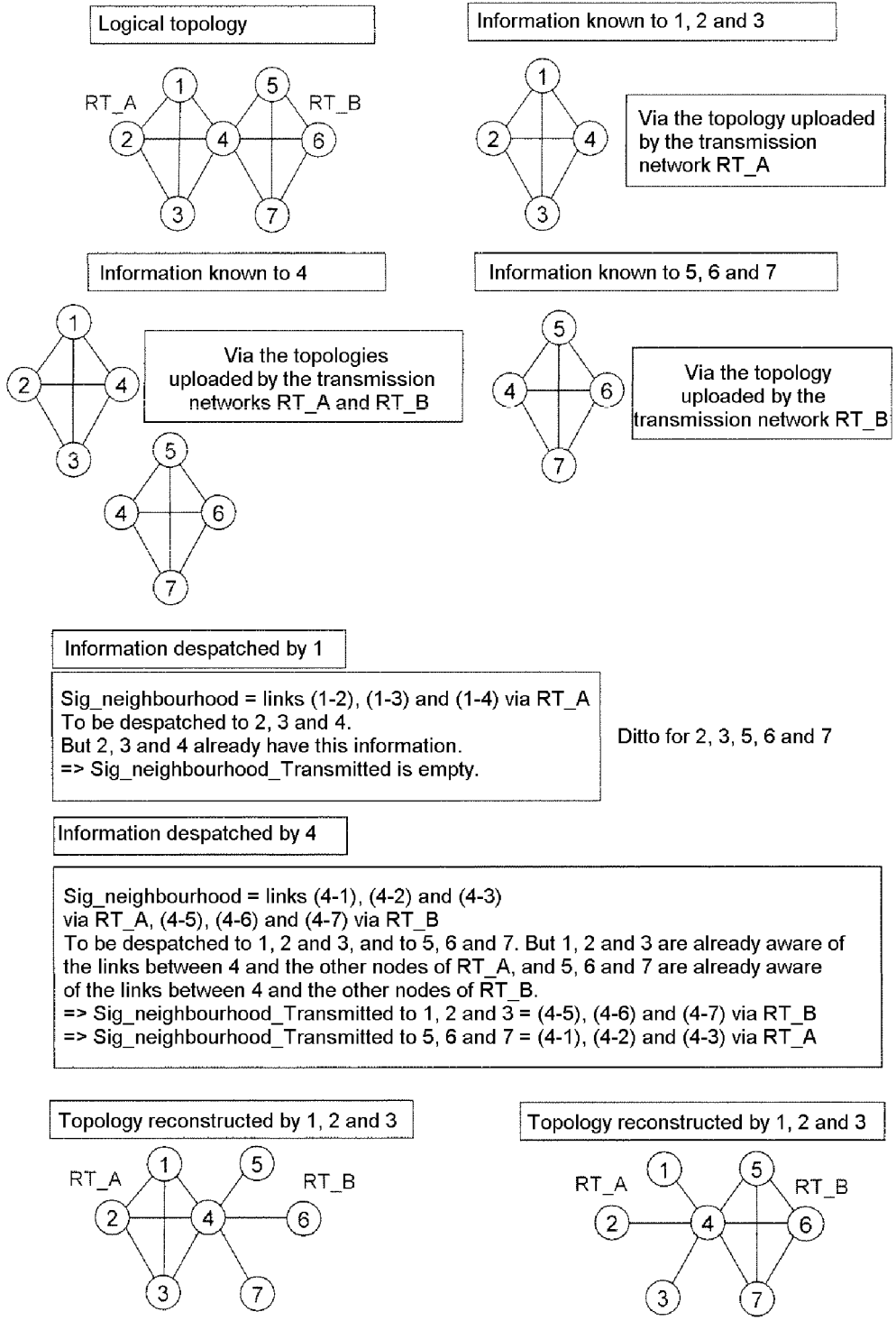
FIG. 7 is an exemplary topology with two networks connected by an RSN.
Figure 8:
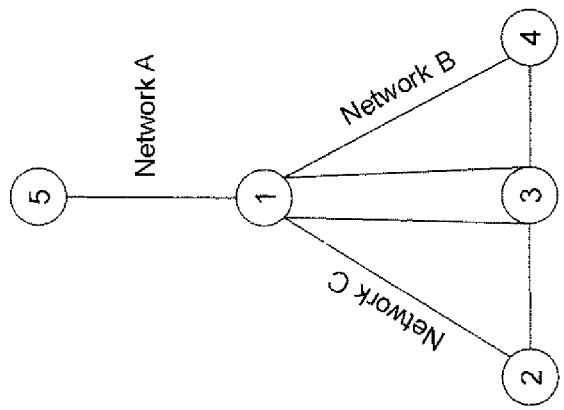
FIG. 8 is a reconstitution of a set of parameters associated with an NIN node on the basis of parameters transmitted by the nodes of the network.

Option Making it Possible Not to Dispatch Some Sig_Neighbourhood_Transmitted, FIG. 7

As long as the Sig_Neighbourhood_Transmitted amounts to the pair (sequence index, CRC), it is not compulsory to dispatch it (i.e. if no Sig_Neighbourhood_Transmitted has ever been dispatched previously). It is obvious that the neighbour not receiving any Sig_Neighbourhood, it will not be able to relay anything even if it is RSN for us.

The reconstituted topology is incomplete, since it lacks the links contained in the Sig_Neighbourhood_Transmitted which have never been transmitted. However these 'non-transmitted' links are of only local interest. The remote nodes, which will have an incomplete topology, do not need these links to calculate the best route whatever criteria are adopted.

For example, let us assume that an elementary network $R_E1$ comprises 4 nodes (1, 2, 3 and 4), all in range of one another. This elementary network is connected to other networks via node 4 and by it alone. Nodes 1, 2 and 3 do not then transmit any Sig_Neighbourhood_Transmitted. Node 4 transmits to the other nodes (5 and plus) its links with 1, 2 and 3: (1, 4), (2, 4), (3, 4). Nodes 5+ will therefore never know of the existence of the links (1, 2), (1, 3), (2, 3). However, to reach 1, 2 or 3, a node 5+ will pass through 4 and will therefore never need these links.

In the example given, only the logical links are considered, the physical topology of the network $R_E1$ not being considered: thus, it is entirely possible for the physical path between 4 and 1 to pass through 2. Physically, the topology corresponds to (4->2->1), but logically, from the "inter elementary network" point of view, the topology is (4->1).

NIN_TOPO_03b: Reconstitution of the Sig_Neighbourhoods on Reception

NIN_TOPO_03/040

When the FIRE protocol receives a Sig_Neighbourhood (N), and N is not a neighbour of the local node, it must store the Sig_Neighbourhood received in the Distant_Neighbourhood_Table table.

NIN_TOPO_03/050 FIG. 8:

When FIRE receives a Sig_Neighbourhood (N), and N is a neighbour of the local node (=>Sig_Neighbourhood received is in fact a Sig_Neighbourhood_Transmitted):

FIRE must reconstitute the Sig_Neighbourhood(N) on the basis of the Sig_Neighbourhood_Transmitted received and of the topologies of the elementary networks.

Thereafter, FIRE must calculate the value of the CRC on the Sig_Neighbourhood reconstituted.

If this CRC is different from the CRC contained in the Sig_Neighbourhood_Transmitted, Then, the enhanced reliability protocol FIRE must store the Sig_Neighbourhood_Transmitted(N) in the Neighbourhood_Rebuilding_Table table 22, FIG. 3 (by replacing the Sig_Neighbourhood_Transmitted(N) already present in the table if necessary), Otherwise, FIRE must store the Sig_Neighbourhood(N) reconstituted in the Distant_Neighbourhood_Table table and if there exists a Sig_Neighbourhood_Transmitted(N) in the Neighbourhood_Rebuilding_Table table, 21 FIG. 3, erase it.

The reconstruction of the Sig_Neighbourhoods as soon as the Sig_Neighbourhoods_Transmitted are received allows the core of FIRE to manipulate only complete Sig_Neighbourhoods.

When the CRC of a Sig_Neighbourhood(A) reconstructed by a node B does not correspond to the initial Sig_Neighbourhood(A), there is an inconsistency between the network topologies provided by the TNAs to node A and those provided to node B. For a given network, two cases can lead to this inconsistency:

B has a version of the topology that is more correct than that of A (the real topology has not yet converged at the level of A). The Sig_Neighbourhood(A) reconstituted by B is different (since it is closer to reality) than the initial Sig_Neighbourhood(A). In this case, when the TNA subsequently provides A with the complete real topology, then A will re-send a new Sig_Neighbourhood, with a new CRC. This time, the CRC received by B will be consistent with the reconstituted CRC. The problem is resolved by virtue of the Sig_Neighbourhood updates sent by A.

B has a version of the topology that is less correct than that of A (the real topology has not yet converged at the level of B). The Sig_Neighbourhood(A) reconstituted by B is different (since it is further from reality) than the initial Sig_Neighbourhood(A). If the topology of the network does not evolve, A will not retransmit any other Sig_Neighbourhood. It is therefore necessary to manage the problem at the level of B. At each update of the topology provided by the TNA, B reconstitutes a new Sig_Neighbourhood and recalculates the corresponding CRC. When the calculated CRC corresponds to the CRC initially received, then B has retrieved the initial Sig_Neighbourhood(A). It then saves it in Distant_Neighbourhood_Table and deletes the Sig_Neighbourhood_Transmitted stored in Neighbourhood_Rebuilding_Table.

NIN_TOPO_03/060

With each receipt of a new elementary network topology originating from a TNA, FIRE must, for each Sig_Neighbourhood_Transmitted present in the Neighbourhood_Rebuilding_Table table:

reconstruct the Sig_Neighbourhood taking into account the data of the new elementary network topology,
calculate the CRC on the Sig_Neighbourhood reconstituted,
if this CRC is equal to the CRC contained in the Sig_Neighbourhood_Transmitted,
Then, FIRE must store the Sig_Neighbourhood(N) reconstituted in the Distant_Neighbourhood_Table table and erase it from the Neighbourhood_Rebuilding_Table table,
Otherwise, do nothing.

Figure 9:
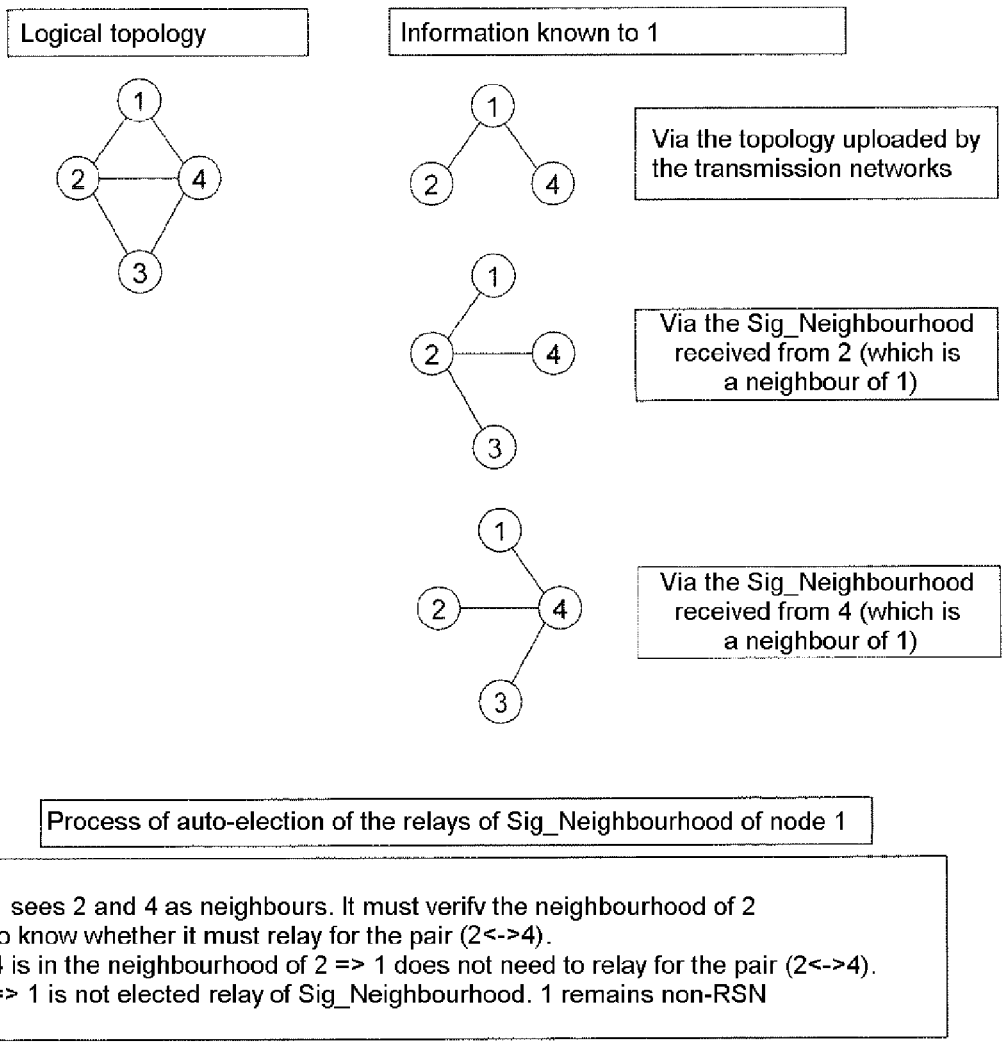
FIG. 9 is an exemplary non-RSN node.
Figure 11:
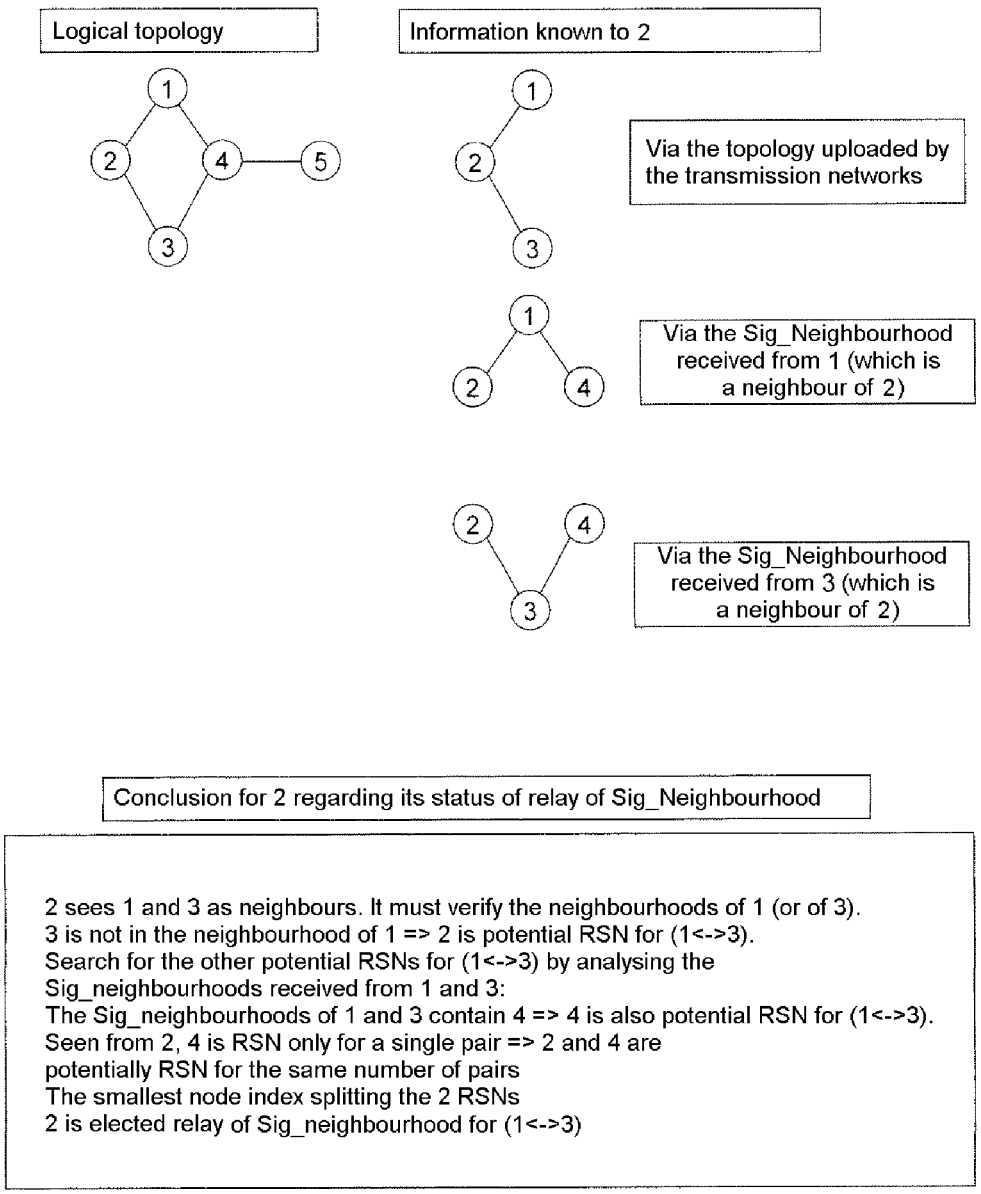
FIG. 11 is a mechanism for detecting potential RSNs and auto-election of an RSN.

Module 14 NIN_TOPO_04 FIGS. 9, 10: Relaying of the Sig_Neighbourhoods by a Subset of the NIN Nodes (Relays of Sig_Neighbourhoods)

Election of the Relays of Sig_Neighbourhood-Principles

The Sig_Neighbourhoods sent by each node must be forwarded to all the NINs, so that each NIN can calculate the topology of the network. They must therefore be relayed. To limit the number of superfluous relayings (i.e. 2 stations relay the same neighbourhood to the same recipients), only a subset of NIN relays the Sig_Neighbourhood. These NINs are called Relays of Sig_Neighbourhood (RSNs for short).

The election of the RSNs is done by auto-designation, which has the advantage of not necessitating any additional exchanges on the networks.

The objective of the mechanism for electing the RSNs is to calculate a distribution graph (DG):
making it possible to cover the origin graph (OG), OG being the graph of the NINs,
the graph DG having a smaller number of nodes than OG.

Such a distribution graph DG is a sub-graph of OG such that, whatever a source belonging to the origin graph OG, an item of information sent by this source can be distributed to all the other nodes of OG while being relayed solely by nodes of DG.

Remarks on the optimization of the distribution graph:
The establishment of such a distribution graph is similar to the problem of the so-called "covering tree of minimum weight", which is an np-complete problem (i.e. no algorithm exists whose calculation time is a polynomial of the number of nodes & links). Therefore even on a known topology, the graph DG having a minimum number of nodes is not calculable in practice (in limited time on a router). Any on-line mechanism for calculating a distribution graph therefore culminates in a sub-optimal graph.

The objective of the distribution graph being to distribute the neighbourhoods so as to establish the graph of the NINs, the distribution graph obviously cannot be constructed on the basis of the complete graph. It is constructed with just the information known by the nodes before the election of the RSNs, namely the Sig_Neighbourhoods of the neighbour nodes. This limited knowledge does not make it possible to go extremely far towards the optimal solution.

Even if the criterion of the minimum number of relays seems to be that to be optimized, other criteria are also beneficial in the case of the protocol according to the invention: broadcast the information as quickly as possible so as to accelerate the convergence of the topology calculation, avoid the broadcast graphs with no alternative route between two distant nodes, etc.

Having regard to the previous remarks and to the difficulty in designing a distribution graph construction mechanism which is aimed at an uncertain optimality, the approach adopted has been to simplify its design. The mechanism adopted for the election of the RSNs has therefore been formulated as a function of the following:

HYPO_RSN_01: All the links are considered to be equivalent for the construction of the distribution graph;
HYPO_RSN_02: The mechanism is based on an auto-election on the basis of the neighbourhoods received (no additional signalling for the election of the RSNs);
HYPO_RSN_03: As soon as an RSN is established, it remains RSN as long as the local topology does not vary;

In tandem with the discovery of the complete topology, it might be tempting to refine the graph of the RSNs. However, this would necessitate on the one hand complementary inter-NIN exchanges on the networks, and on the other hand the Sig_Neighbourhoods being relayed only once and in enhanced reliability mode, the change of status from RSN to non-RSN could culminate in inconsistencies of distribution.

To construct the graph of the RSNs, we start from the intrinsic property of a Relay of Sig_Neighbourhood: A Relay of Sig_Neighbourhood makes it possible to make a connection between two nodes which are not directly in sight of one another.

Therefore, in order for a node to be RSN, it must know that two of its neighbours are not in sight of one another. The reception of the Sig_Neighbourhoods of its neighbours suffices to establish this knowledge, as shown by the examples hereinbelow in relation to FIGS. 9 and 10.

NIN_TOPO_04/010 FIGS. 9, 10:

A node N is potential RSN for a pair of nodes (A, B), no. (A)<no. (B), if and only if all the following conditions are fulfilled:

A and B are neighbours of N,
A and B do not form part of one and the same elementary network,
N has a Sig_Neighbourhood(A) and a Sig_Neighbourhood (B) in its table of Sig_Neighbourhoods,
B is absent from Sig_Neighbourhood(A).

For a given pair, it is always the neighbourhood of the smallest node index which is analysed. In the case of consistent neighbourhoods, if A is B's neighbour, B is then A's neighbour (the logical links contained in the neighbourhoods are symmetric). In the case of inconsistent neighbourhoods, as only a single neighbourhood is analysed, there is no case of inconsistency to be processed in the algorithm.

Not all the potentially RSN nodes are systematically elected RSN: if two potentially RSN nodes are equivalent (i.e. relay between the same neighbours, like nodes 2 and 4 in the diagram hereinabove), it suffices to keep just one of them to construct the distribution graph.

By definition, a potentially RSN node $N_2$ equivalent to another node $N_1$, for a given pair of neighbours (VA, VB), is both VA's neighbour and VB's neighbour. It is therefore present in the Sig_Neighbourhoods of VA and VB, received by $N_1$. The common nodes between VA and VB (with A and B not mutual neighbours) are therefore the potential RSNs for A and B. By analysis of the neighbourhoods, each potential RSN node can therefore find the other potential RSN nodes.

NIN_TOPO_04/020, FIG. 11

Consider a pair of neighbours (A, B).
Let nc(i) be the number of pairs of neighbours relayed by each node i which is a potential RSN of (A, B), the pairs taken into account having to be detectable by all the other nodes that are potential RSNs of (A, B).
Let max_nc be the maximum of the nc(i), calculated over the set of potential RSNs of (A, B).
FIRE must be elected RSN for a pair of neighbours (A, B) if and only if:
  it is a potential RSN for the pair (A, B),
  and if it complies with one of the following three conditions:
    1°/ It is the only potential RSN node for the pair (A, B),
    2°/ It is the only node i of which nc(i)=max_nc
    3°/ Among all nodes i of which nc(i)=max_nc, it possesses the smallest node identifier.
FIRE must save the list of pairs (A, B) of which it is RSN in the RSN_ Status_ table, 23 FIG. 3.

Case of Non-receipt of Sig_Neighbourhoods of the Neighbours

The Sig_Neighbourhoods of the neighbours may not be received:
  subsequent to the optimization of the Sig_Neighbourhoods_Transmitted, in certain cases, no Sig_Neighbourhood is sent by a neighbour,
  in the case of losses of messages.

In this case, according to the previously described algorithm for electing the RSNs, an NIN which does not receive a Sig_Neighbourhood of a neighbour may not be elected potential RSN and still less RSN. To make up for this deficiency, an NIN can also be auto-elected RSN, according to the mechanism hereinbelow, described in NIN_TOPO_04/030.

NIN_TOPO_04/030

On modification of Local_Topologies_Table, in the case of the appearance of new neighbour nodes (i.e. nodes which did not exist in the previous Local_Topologies_Table), FIRE must perform the processings described in the remainder of the requirement.

FIRE must trigger the timer RSN_waiting_neighbourhood_timer.

If RSN_first_topology=TRUE, then FIRE must trigger the timer MAX_RSN_waiting_neighbourhood_timer and thereafter toggle RSN_first_topology to FALSE.

If FIRE receives at least one Sig_Neighbourhood of each new neighbour before expiry of one of the 2 timers, then it calculates its RSN status according to the requirements NIN_TOPO_04/010 and NIN_TOPO_04/020.

Otherwise (expiry of one of the two timers):
  for all the pairs (A, B) of which it has the Sig_Neighbourhoods, FIRE must calculate its RSN status according to the requirements NIN_TOPO_04/010 and NIN_TOPO_04/020.
  for all the pairs (A, B) of which it has only a single of the two Sig_Neighbourhoods (e.g.: that of A), FIRE must be elected RSN for (A, B) if:
    B does not appear in Sig_Neighbourhood(A),
    and A and B do not form part of one and the same elementary network (i.e. are not together in a topology uploaded by a TNA).
  for all the pairs (A, B) of which it has none of the Sig_Neighbourhoods, FIRE must be elected RSN for (A, B) if:
    A and B do not form part of one and the same elementary network
  In all cases, FIRE must toggle RSN_first_topology to TRUE.
FIRE must save the list of pairs (A, B) of which it is RSN in the RSN_ Status_ table.

NIN_TOPO_04/040

On modification of Local_Topologies_Table not processed by NIN_TOPO_04/030, in the case of disappearance of neighbour nodes, then FIRE must calculate its RSN status according to the requirements NIN_TOPO_04/010 and NIN_TOPO_04/020.

NIN_TOPO_04/045

On modification of Distant_Neighbourhood_Table relating to at least one Sig_Neighbourhood of a neighbour, then FIRE must calculate its RSN status according to the requirements NIN_TOPO_04/010 and NIN_TOPO_04/020. Algorithm for electing the Relays of Sig_Neighbourhood Definitions Let a be the local node, i.e. that on which the algorithm is executed.

Let Va be the set of neighbour nodes of a. Va is the local neighbourhood, calculated on the basis of the information provided by the TNAs.

Let Wa,i be the set of neighbours of a node i∈Va. Wa,i is the set of nodes contained in the Sig_Neighbourhood of i. If no Sig_Neighbourhood is received, Wa,i={a}.

Let L be the set of nodes of the local topology which consists of the local node, of the neighbour nodes and of the neighbour nodes within two hops.

$$L = Va \cup Wa, i/i \in Va$$

Step 1

The first step includes constructing, for each node n∈L, the known set of neighbour nodes of n, Vn.
If n∈Va, Vn=Wa,n by definition.
If n∉Va, Vn={nodes i, such that n∈Wa,i}

Step 2

The second step includes establishing, for each node n, the set of pairs (i, j) such that i and j are neighbours of n, but are not mutual neighbours. This set is denoted by Cn.
Let n∈L. We then have Cn={(i, j) with i and j belonging to Vn, such that i≠j, i∉Vj, and j∉Vi }
Denoting by C, the union of the values Cn, for all the nodes of L:

$$C = \bigcup_{n \in L} Cn.$$

C contains the set of pairs of nodes of the local topology L which are neighbours within 2 hops without being mutual neighbours.
By construction, Cn is the set of pairs for which n is potential RSN.

Step 3

The third step includes determining, for each pair c of nodes that are 2 hops apart and not mutual neighbours, the set of potential RSNs of the pair c, denoted Rc.
By definition, the pairs to be considered are the elements of C.
Let c∈C. By definition of the Cn and of Rc, we have: Rc={nodes n, s.t. c∈Cn}.
Let us denote by R, the union of the values Rc, for all the pairs c of C:

$$R = \bigcup_{c \in C} Rc.$$

Step 4

The fourth step includes determining the set of pairs for which the local node (node a) is relay.

Assignment of a Weight to Each Potential RSN

For each node n∈L:
Associate a weight with n, weight equal to the number of pairs for which n is potential relay.
p(n): L→N
n→Number of Ri∈R, such that n∈Ri
The weight function presented hereinabove is merely an example. The algorithm may be adapted with the aid of other weight functions, as long as they meet the following criterion: the weight function must make it possible to sort the nodes in the same manner, whatever node of the local topology the calculation is performed on.
An example of such a weight function: p(n)=n.

Calculation of the Pairs for Which the Local Node is Relay

The set of pairs for which the local node 'a' is RSN consists of the pairs 'c' such that 'a' is potential relay of 'c' (a∈Rc) and that the weight of 'a' is the highest with respect to the weights of the other potential relay nodes of the pair 'c'. In the case of equality of weight with other potential relays, 'a' is RSN of 'c' if and only if 'a' possesses the smallest node index among the set of potential relays of 'c' of maximum weight.
Let C_RSN(a) be the set of pairs for which 'a' is RSN. C_RSN(a) is calculated in the following manner:
For each pair c of C for which a∈Rc:
  Let Rc_PM be the set of nodes of Rc whose weight is maximum. Rc_PM={i∈Rc, such that p(i)≥p(j), whatever j∈Rc}
  Let $n_m$ be the node of smallest index which belongs to Rc_PM (there exists one and only one).
  The node 'a' is RSN of 'c' if and only if $n_m$=a. This can be written: $C \in C_{RSN(a)}$ ssi $n_m$=a.
The set of pairs for which the local node is relay is thus obtained.

Relaying of the Sig_Neighbourhoods FIG. 12

The RSNs relay the Sig_Neighbourhoods gradually until all the nodes of the system have the same neighbourhood database. The enhancement of reliability of this forwarding is done by the RSNs (cf. NIN_TOPO_05, module 15), and not by repetitions performed by the origin node of the Sig_Neighbourhood. This implies that once an NIN has generated its Sig_Neighbourhood and has transmitted it successfully to its neighbours, it no longer retransmits it. Its next transmission will take place when the content of the Sig_Neighbourhood has changed.
This principle has two major consequences:
When the topology is stable and all the nodes have received the neighbourhoods up to date from the other nodes, no more nodes send a Sig_Neighbourhood: the FIRE signalling traffic becomes zero.
The updating of the table of Sig_Neighbourhoods of a node A is done by the RSNs "of A", which are neighbours of A, and not by the originating nodes of the Sig_Neighbourhoods. This closest possible updating allows a gain in terms of reactivity and bandwidth.
A Relay of Sig_Neighbourhood is therefore in charge:
of relaying the neighbourhoods when it receives them, as a function of the pairs of neighbours for which it is relay,
of storing them to ensure the synchronization of the tables of Sig_Neighbourhoods of these same neighbours, when necessary.
NIN_TOPO_04/050

Relaying of the Neighbourhoods

An NIN A, RSN for pairs (Xi, Yi), relays every Sig_Neighbourhood received from Xi to the node Yi (and vice versa from Yi to Xi), except if:
A has already received this Sig_Neighbourhood (same [source, sequence index] pair) or a more recent version, originating from Yi (resp. Xi),
Yi (resp. Xi) already appears in the table of Sig_Neighbourhoods of A, as recipient of this Sig_Neighbourhood (same [source, sequence index] pair) or of a more recent version, Yi (resp. Xi) is the origin node of the Sig_Neighbourhood,
Yi (resp. Xi) is a neighbour of the origin node of the Sig_Neighbourhood.

The above conditions make it possible to avoid unnecessary dispatches. They require the RSNs to store the Sig_Neighbourhoods received and the index of NIN neighbours that dispatched this Sig_Neighbourhood to them.
NIN_TOPO_04/060

Toggling of a Node A to Relay of Sig_Neighbourhood Mode for a Pair of Neighbours (X, Y)

When an NIN A (again) becomes RSN for a pair (X,Y), it must relay to Y all the stored Sig_Neighbourhoods that it has received from X (and vice versa), except if:
A has already received this Sig_Neighbourhood (same [source, sequence index] pair) originating from Y (resp. X),
Y (resp. X) already appears in the table of Sig_Neighbourhoods of A, as recipient of this Sig_Neighbourhood (same [source, sequence index] pair),
Y (resp. X) is the origin node of the Sig_Neighbourhood,
Y (resp. X) is a neighbour of the origin node of the Sig_Neighbourhood.

The receipt of sequence indices that are older than the sequence index stored is dealt with in the paragraph NIN_TOPO_08.

Storage of the Sig_Neighbourhoods

It should be noted that in the requirement NIN_TOPO_04/060, it is not specified if A was already RSN for another pair. The two cases ('A was already RSN', 'A was non-RSN') are possible. If A was non-RSN, it must nevertheless be able to comply with this requirement, and therefore have stored all the Sig_Neighbourhoods received, and have noted which neighbour has sent or relayed each Sig_Neighbourhood to it.
NIN_TOPO_04/070

Storage of the Sig_Neighbourhoods

For each Sig_Neighbourhood received, FIRE must verify whether there exists a Sig_Neighbourhood of the same origin node and of identical or more recent sequence index.
If so, then FIRE must delete the Sig_Neighbourhood received.
Otherwise FIRE must store, in a table called Distant_Neighbourhood_Table:
index of the NIN_origin of the Sig_Neighbourhood (i.e. which initially generated the Sig_Neighbourhood),
sequence index of the Sig_Neighbourhood,
the list of neighbour NINs which have dispatched a Sig_Neighbourhood (NIN_origin) to the local node. This list is denoted by LPHR (List Of Previous Hops NINs),
the content of the Sig_Neighbourhood received. The content of the Sig_Neighbourhood consists of the links of the origin node with its neighbours, each link being a pair:
neighbour node index,
transmission network to be traversed to reach the neighbour node.
One and the same node can appear several times in the content of the Sig_Neighbourhood if the origin node can reach it through several transmission networks.

The sequence index of the Sig_Neighbourhood stored is the most recent sequence index present in the list LPHR.
NIN_TOPO_04/080

Storage of the Information of the Sig_Neighbourhoods Relayed Successfully

Each NIN must store, in the Distant_Neighbourhood_Table table, an exemplary format of which is given in FIG. 13, for each Sig_Neighbourhood received:
the list of neighbour NINs to which the local node has relayed a Sig_Neighbourhood(NIN_origin) and which have acknowledged positively. This list is denoted by LANH (List of Acknowledged Next Hops).
NIN_TOPO_04/090

Preservation of the Sig_Neighbourhood of a Node Disappearing From the Neighbourhood or the Topology Subsequent to a re-calculation of the local neighbourhood or of the topology, FIRE must preserve in the table of distant Sig_Neighbourhoods, an example of which is given in FIG. 14 (Distant_Neighbourhood_Table), all the Sig_Neighbourhoods of the nodes that have disappeared.
This preservation makes it possible to limit the exchanges of Sig_Neighbourhood in the case of reconnection of 2 parts of the system.
There is never deletion of an origin node, since there is no mechanism of aging in the normal operation of the protocol.

Radio Silence

The impact of Radio Silence is as follows:
Allowance for the stations in Radio Silence in the calculation of the topology, by considering that all the stations in Radio Silence have links oriented in the incoming direction only, and therefore no outgoing link.
The neighbours no longer dispatch a Sig_Neighbourhood to the station in Radio Silence on the RS links.
A station in RS cannot be potential RSN
Module 15 NIN_TOPO_05: Hop by Hop Enhancement of Reliability of the Transmission of the Sig_Neighbourhoods
NIN_TOPO_05/010

Hop by Hop Enhancement of Reliability

When FIRE transmits a Sig_Neighbourhood to neighbour NINs, it must ask the underlying layers used, to dispatch the Sig_Neighbourhood in enhanced reliability mode.
The hop by hop enhancement of reliability function is preferably situated in the TNAs, since it depends on the intrinsic properties of the medium (use of TCP on a unicast IP network, PMUL on a VHF network, etc.).
Module 16 NIN_TOPO_06: Transmission of the Sig_Neighbourhoods in Point-to-multipoint Mode
NIN_TOPO_06/010

Dispatching in Point-to-multipoint Mode

When FIRE transmits a Sig_Neighbourhood to neighbour NINs, it must if possible ask the underlying layers used, to dispatch the Sig_Neighbourhood in point-to-multipoint mode.
The Forwarder then duplicates the Sig_Neighbourhood if it must be sent on various elementary networks. Thereafter, each TNA decides to undertake one or more dispatches, with an adapted enhancement of reliability (cf. NIN_TOPO_05), according to the type and the nature of the underlying network (point-to-point or broadcast, reliable or with significant losses, etc.).
Module 17 NIN_TOPO_07:
Announcement of the Oriented Characteristics of the Logical Links Solely by the Source Routers of the Links There exist characteristics of links which depend on the direction of the link. The throughput of a radio connection between A and B may be different from the connection between B and A. At the level of node A, the topology uploaded by a TNA may contain both the throughput from A to B and from B to A.

If A and B each announce in their Sig_Neighbourhood both throughputs:
  on the one hand, the same item of information is dispatched twice across the system,
  on the other hand, inconsistencies within the topology of the TNAs would be treated with FIRE.
NIN_TOPO_07/010

Announcement of the Oriented Characteristics of the Logical Links

When a FIRE transmits the Sig_Neighbourhood from the local NIN to neighbour NINs, it must remove any item of information which depends on the orientation of the links and which relates to the oriented links of which it is destination (i.e. of which it is not the source).
Module 18 NIN_TOPO_08: Marking of the Signalling Data so as to Manage Non-sequencing in Reception
The Sig_Neighbourhoods are stamped with a sequence index, chosen by the source of this Sig_Neighbourhood.
NIN_TOPO_08/010

Sequence Index of the Sig_Neighbourhoods

When FIRE transmits the Sig_Neighbourhood from the local NIN to neighbour NINs, it must include therein a sequence index making it possible to detect the reboots of the nodes and the desequencings introduced by the network transmission.
When the machines on which FIRE is installed are synchronized (to within a few seconds), FIRE must use a date as value of sequence index.
Module 19 NIN_TOPO_09 Calculation of the Global Topology
Principles for Constructing the Global Topology.

On the basis of all the Sig_Neighbourhoods received, each NIN constructs the graph of the topology starting from itself, and then of its neighbours, etc., taking into account only the information provided by the analysed node: when the Sig_Neighbourhood of a node A is analysed, oriented links starting from A are traced to all the NINs declared in this Sig_Neighbourhood as neighbours of A. We will call this principle of graph construction "oriented construction".

The principle of oriented construction makes it possible to manage the absence of any idea of aging of the Sig_Neighbourhoods. Conventionally, to manage the disappearance of a node (fault, destruction or simply temporary non-accessibility), the link-state protocols consider that the non-receipt of a neighbourhood of this node for a certain duration signifies that it is necessary to delete the neighbourhood information of this link. This is based on the fact that they regularly repeat the neighbourhoods. As FIRE, to economize on band and render the enhancement of reliability of the exchanges more suited to the networks, does not repeat the neighbourhoods but enhances reliability hop by hop, this aging mechanism may not operate.

The principle underlying oriented construction is as follows: when a node A disappears, its neighbours are aware of this. The neighbours "closest" to us (e.g.: B) will therefore announce to us (indirectly, by their new neighbourhood) the disappearance of their link with node A. Even if we preserve the Sig_Neighbourhood of A (which can remain true or false, we cannot know), the link between A and B becomes oriented solely from A to B, and no longer from B to A. A then becomes inaccessible to us from B.

Algorithm for Constructing the Global Topology

Let 'a' be the local node.
Let NAT be the set of nodes to be processed, i.e. the nodes for which it is necessary to analyse the Sig_Neighbourhood so as to add links to the topology graph. Initially, NAT={a}.
Let NDT be the set of already processed nodes, i.e. the nodes whose Sig_Neighbourhood has already been taken into account. Initially, NDT=ø.
Let G be the global topology graph, represented in the form of a set of links, each link being a triple, consisting of the 2 end nodes of the link and of the transmission network traversed. Initially, G=ø.
  As long as NAT≠ø, carry out the following processing:
  Let n be the first element of NAT.
    Subtract n from NAT: NAT=NAT−{n}
  Let V be the set of neighbours contained in the Sig_Neighbourhood of n.
  Add to the graph G the set of links between n and the elements of V:
    For each v of V, do G=G ∪ {(n, v, $R_T$)}. ($R_T$ being the transmission network).
  Let VJT be the subset of V, whose elements do not belong to NDT. VJT represents the neighbours that have never been processed previously.
    By definition: VJT=V−NDT
  Add these neighbours to the set of neighbours to be processed:
    NDT=NAT ∪ VJT
  Add n to the set of already processed nodes:
    NDT=NDT ∪ {n]NDT=NDT ∪ {n}
  If NAT is empty:
    Then the construction of the graph is finished.
    Otherwise, continue the processing by resuming at "Let n be the first element of NAT".
The method according to the invention presents notably the advantages listed hereinafter: the FIRE protocol is based on four major principles:
  The recovery of the media topologies,
  Enhanced reliability broadcasting,
  Management of recipient nodes and not of output interfaces,
  Relevant sending of information (No sending of information known by the neighbour nodes.)

Principle 1 (P1): Recovery of the Media Topologies

The transmission network (UHF, VHF, etc.) uploads the local topology to the nodes. Each node takes cognizance of its local topology without FIRE sending the least packet, thus saving network bandwidth.

Principle 2 (P2): Enhanced Reliability Broadcasting

The topology information exchanged between the nodes is broadcast in a reliable manner, by virtue of the following mechanisms.

Broadcasting

Each node, on the basis of its local topology uploaded by the transport network (P1), and of the neighbourhood of its neighbours, establishes a finite and deterministic subset of pairs of nodes for which it will be relay of neighbourhoods (RSN). This auto-election is by local construction and does not require any additional transmission on the part of FIRE.

Thus, for example, if a node A is auto-elected neighbourhood relay (RSN) for the pair of neighbour nodes (B, C), any neighbourhood message sent by B (and respectively by C) will be retransmitted by A to C (respectively to B).

Broadcasting is therefore by construction greatly limited with respect to a conventional broadcast by flooding.

Enhancement of Reliability

The enhancement of reliability of the neighbourhood messages is for its part performed by acknowledgement. This acknowledgement may be performed by the network forwarding function or by the medium layer.

Principle 3 (P3): Management of Recipient Nodes and Not of Output Interface

In contrast to many protocols described in the literature, FIRE is based on an approach for managing the recipient nodes, and not output interfaces.

The topology information is sent to a node in particular and not over a network. This makes it possible, in the case of parallel networks, to use just one of the networks to send the neighbourhood signalling packet to this same node, thus limiting the bandwidth consumed. The choice of this network (the fastest, the most robust, that covering the most recipient nodes) is left to the network forwarding function.

Principle 4 (P4): Relevant Sending of Information

Based on principle P3, when two nodes A and B are neighbours in the topological sense of the term (P1), it is not necessary for A (respectively B) to transmit common information to B (respectively A). Only the additional, and therefore relevant, information is transmitted.

This affords the method according to the invention at least the following advantages:
Absence of traffic in the case of stable topology
Low volumetry of protocol exchanges
In the case of parallel networks, absence of traffic on certain networks
Fast convergence

What is claimed is:

1. A method of enhanced reliability routing within a system comprising one or more networks including several nodes connected together by communication means, said system having a transmission network access (TNA) charged with transmitting on a physical medium, data to a next network interconnection node (NIN), said system using a link-state routing protocol for constructing a global topology of the nodes within the system, wherein said method of enhanced reliability routing determines a logical topology of network interconnection nodes (NINs) by the following steps:

discovering a neighbourhood using a Module NIN_TOPO_01 as a Neighbourhood Discovery Module by virtue of intrinsic functions of the one or more networks;
smoothing a neighbourhood using a Smoothing Module: $NIN_{13}$ TOPO_02 using information provided by the TNA to improve stability of the link-state routing protocol;
distributing the neighbourhood to the NINs using a Distribution Module NIN_TOPO_03;
relaying of the information associated with a node including neighbours, links and their characteristics denoted as Sig_Neighbourhoods by a subset of the NIN nodes being a relay of Sig_Neighbourhoods using a Relay Module NIN_TOPO_04;
enhancing hop by hop a reliability of a transmission of the Sig_Neighbourhoods between the various nodes using an Enhancement Module NIN_TOPO_05;
transmitting the Sig_Neighbourhoods in a point-to-multipoint mode using a Transmission Module NIN_TOPO_06;
announcing oriented characteristics of logical links in the logical topology solely by source routers of the logical links using an Announcement Module NIN_TOPO_07;
marking of signalling data so as to manage non-sequencing in reception associated with the transmitting using a Marking Module NIN_TOPO_08; and
calculating the global topology using a Calculation Module NIN_TOPO_09.

2. The method according to claim 1, wherein said calculating the global topology comprises:
denoting 'a' to be a local node;
denoting 'NAT' to be a set of nodes to be processed corresponding to the nodes for which it is necessary to analyse the Sig_Neighbourhood so as to add the links to a topology graph where initially, NAT ={a};
denoting 'NDT' to be a set of already processed nodes whose Sig_Neighbourhood has already been taken into account where initially, NDT=a parameter ø;
denoting 'G' be a global topology graph associated with the global topology, represented as a set of links, each link being a triple, having two end nodes of the link and of the transmission network traversed, initially, G=ø;
as long as NAT≠ø, execute the following steps:
letting n be a first element of NAT;
subtracting n from NAT: NAT=NAT−{n};
letting V be a set of neighbours contained in the Sig_Neighbourhood of n;
adding to the graph G a set of links between n and elements of V, for each v of V, do G=G∪{(n,v,$R_T$)}, $R_T$ being the transmission network access;
let VJT be a subset of V, whose elements do not belong to NDT, VJT represents the neighbours that have never been processed previously;
by definition: VJT≡V−NDT;
adding the neighbours to the set of neighbours to be processed by NAT≡NAT∪VJT;
adding n to the set of already processed nodes by NDT≡NDT∪{n}; and
if NAT is empty, indicating that a construction of the global topology graph is finished, otherwise, continuing by letting n be a first element of NAT.

3. The method according to claim 1, wherein the neighbourhood discovery module uses the following modules and steps:
a transmission module or a forwarder that relies on the transmission networks to calculate its neighbourhood information denoted NIN_TOPO_01/010;

each access to the TNA of the NIN node provides the link-state routing protocol with an elementary network topology of which it forms a part, use a topology comprising the description of a graph of nodes having the following properties:

each node represents an NIN or a transmission relay;

each link is a symmetric link, having a possibility of transmission, and for a given node, each end of the link transmits to the other link;

using an NIN address to connection address resolution function and the reciprocal function ensured by the TNA, the topology provided contains addresses of NIN nodes, NIN_TOPO_01/020;

when the TNA provides the elementary network topology, it provides the following complementary information:

throughput of each link, with orientation of the link in the case of non-symmetric throughputs;

mean access time to the physical channel of each link;

quality of each link good, average, or bad, deduced, from information provided by the modem situated in the physical medium of the system.

4. The method according to claim 1, wherein the smoothing module for smoothing the information provided by the TNAs executes the following steps of the method comprising:

smoothing certain variations of the characteristics of the links before including them in a neighbourhood broadcast to the other nodes, using a module NIN_TOPO_02/010 according to dynamic characteristics of transmission networks;

ranking the numbers of hops into three categories of close, medium, and distant with a hysteresis to enter and exit each category as a function of the number of real hops, so that the neighbourhoods can be dispatched to the neighbour NINs nominatively, updating and providing the 1-hop topology to the forwader using a module NIN_TOPO_02/020, to manage meshed networks and smooth an evolution of their topology;

saving the smoothed topology in a Local_Topology_Table table using a module NIN_TOPO_02/030, on receipt of a topology of an elementary network, and once the smoothing operation has been performed in NIN_TOPO_02/020; and when Local_Topologies_Table is modified, a function for constructing the global topology graph recalculates the global topology graph and updates the topology of the NINs.

5. The method according to claim 1, wherein said module NIN_TOPO_04 for relaying the information associated with a node executes the following modules:

NIN_TOPO_04/010, where A node N is a potential relay of Sig Neighbourhoods (RSN) for a pair of nodes (A, B), no.(A)<no.(B), if and only if all the following conditions are fulfilled:

A and B are neighbours of N;

A and B do not form part of one and the same elementary network;

N has a Sig_Neighbourhood(A) and a Sig_Neighbourhood(B) in its table of Sig_Neighbourhoods; and B is absent from Sig_Neighbourhood(A);

NIN_TOPO_04/020, comprising:

consider a pair of neighbours (A, B);

let nc(i) be the number of pairs of neighbours relayed by each node i which is a potential RSN of (A, B), the pairs taken into account having to be detectable by all the other nodes that are potential RSNs of (A, B); and let max_nc be the maximum of the nc(i), calculated over the set of potential RSNs of (A, B), wherein said protocol is elected as RSN for a pair of neighbours (A, B) if and only if it is a potential RSN for the pair (A, B), and if it complies with one of the following conditions:

1°/ It is the only potential RSN node for the pair (A, B);

2°/ It is the only node i of which nc(i)=max_nc; and

3°/ Among all nodes i of which nc(i) =max_nc, it possesses the smallest node identifier, and wherein said method uses an enhanced reliability radio topology function (FIRE) that saves the list of pairs (A, B) of which it is RSN in the RSN_Status_Table table.

6. The method according to claim 5, wherein said method executes for an election for relaying the information at least the following steps:

letting a be a local node on which the algorithm is executed;

letting Va be the set of neighbour nodes of a, where Va is a local neighbourhood, calculated on the basis of the information provided by the TNAs;

letting Wa,i be the set of neighbours of a node i∈Va. Wa,i is the set of nodes contained in the Sig_Neighbourhood of I;

if no Sig_Neighbourhood is received, Wa,i={a}; and let L be the set of nodes of a local topology, including the local node, of the neighbour nodes and of the neighbour nodes within two hops. L=Va∪Wa,i/i∈Va, wherein the first step includes constructing, for each node n∈L, the known set of neighbour nodes of n, Vn, if n∈Va, Vn=Wa,n by definition, if n∉Va, Vn={nodes i, such that n∈Wa,i}, the second step comprises establishing, for each node n, the set of pairs (i, j) such that i and j are neighbours of n, but are not mutual neighbours, the said set being denoted by Cn, let n∈L, and Cn={(i, j) with i and j belonging to Vn, such that i≠j, i∉Vj, and j∉Vi}, the union C of the values Cn, for all the nodes of L:

$$C = \bigcup_{n \in L} Cn,$$

where C includes the set of pairs of nodes of the local topology L which are neighbours within 2 hops without being mutual neighbours, and Cn is the set of pairs for which n is potential RSN, the third step comprises determining, for each pair c of nodes that are 2 hops apart and not mutual neighbours, the set of potential RSNs of the pair c, denoted Rc, c∈C., Rc={nodes n, s.t. c∈Cn}, and the union R of the values Rc, for all the pairs c of C:

$$R = \bigcup_{c \in C} Rc,$$

the fourth step comprises determining the set of pairs for which the local node (node a) is relay, by executing the following steps:

assignment of a weight to each potential RSN, for each node n∈L:

associate a weight with n, weight equal to the number of pairs for which n is potential relay;

p(n): L→N; and n→Number of Ri∈R, such that n∈Ri, or by using a weight function suitable for sorting the nodes, depending on the node of the local topology on which the calculation of the local neighborhood is performed.

7. The method according to claim 5, wherein a calculation of the pairs for which a local node is relayed is executed by the following steps:

letting C_RSN(a) be the set of pairs for which 'a' is RSN, C_RSN(a) is calculated in the following manner:
for each pair c of C for which a∈Rc:
let Rc_PM be the set of nodes of Rc whose weight is maximum,
Rc_PM={i∈Rc, such that p(i)≥p(j), whatever j∈Rc;
let $n_m$ be the node of smallest index which belongs to Rc_PM (there exists one and only one); and
the node 'a' is RSN of 'c' if and only if $n_m$=a or else: c∈$C_{RSN(a)}$ssi $n_m$=a.

8. The method according to claim 5, wherein an NIN A, RSN for pairs (Xi, Yi), relays every Sig_Neighbourhood received from Xi to the node Yi and vice versa from (Yi to Xi), except if:
A has already received a same Sig_Neighbourhood (same [source, sequence index] pair) or a recent version, originating from Yi (resp. Xi);
Yi (resp. Xi) already appears in the table of Sig_Neighbourhoods of A, as recipient of this Sig_Neighbourhood (same [source, sequence index] pair) or of a more recent version;
Yi (resp. Xi) is an origin node of the Sig_Neighbourhood; or
Yi (resp. Xi) is a neighbour of the origin node of the Sig_Neighbourhood.

9. The method according to claim 5, wherein when an NIN A becomes RSN for a pair (X,Y), it relays to Y all the stored Sig_Neighbourhoods that it has received from X (and vice versa), except if:
A has already received same Sig_Neighbourhood (same [source, sequence index] pair) originating from Y (resp. X);
Y (resp. X) already appears in the table of Sig_Neighbourhoods of A, as recipient of this Sig_Neighbourhood (same [source, sequence index] pair);
Y (resp. X) is an origin node of the Sig_Neighbourhood; or
Y (resp. X) is a neighbour of the origin node of the Sig_Neighbourhood.

10. The method according to claim 5, wherein for each Sig_Neighbourhood received, the method verifies whether there exists a Sig_Neighbourhood of the same origin node and of identical or more recent sequence index, and if so, then the method deletes the Sig_Neighbourhood received, Otherwise the method stores, in a table Distant_Neighbourhood_Table:
the index of the NIN_origin of the Sig_Neighbourhood (i.e. which initially generated the Sig_Neighbourhood);
the sequence index of the Sig_Neighbourhood;
a list LPHR (List Of Previous Hops NINs) of neighbour NINs which have dispatched a Sig_Neighbourhood (NIN_origin) to a local node;
the content of the Sig_Neighbourhood received, comprising the links of the origin node with its neighbours, each link being a pair including a neighbour node index, and a transmission network to be traversed to reach the neighbour node,
wherein the sequence index of the Sig_Neighbourhood stored is the most recent sequence index present in the list LPHR.

11. The method according to claim 5, wherein each NIN stores, in a Distant_Neighbourhood_Table table, for each Sig_Neighbourhood received a list of neighbour NINs to which a local node has relayed a Sig_Neighbourhood(NIN_origin) and which have acknowledged positively, said list being denoted by LANH (List of Acknowledged Next Hops).

12. The method according to claim 5, wherein subsequent to a re-calculation of the local neighbourhood or of the topology, the method preserves in a table of distant Sig_Neighbourhoods (Distant_Neighbourhood_Table) all the Sig_Neighbourhoods of the nodes that have disappeared.

13. The method according to claim 1, wherein the enhancing module NIN_TOPO_05 of hop by hop enhancement of reliability of the transmission of the Sig_Neighbourhoods to neighbour NINs is situated in the TNAs.

14. The method according to claim 1, wherein the transmission Module $NIN_{13}TOPO_{13}06$ for transmitting the Sig_Neighbourhoods in point-to-multipoint mode implements the following steps during the transmission of a Sig_Neighbourhood to neighbour NINs:
asking the underlying layers used, to dispatch the Sig_Neighbourhood in point-to-multipoint mode;
duplicating using a forwarder the Sig_Neighbourhood if it must be sent on various elementary networks; and
deciding at each TNA to undertake one or more dispatches, with an adapted enhancement of reliability, according to the type and the nature of the underlying network.

15. The method according to claim 14, further comprising using a module NIN_TOPO_03/030, comprising the following steps:
a local Sig_Neighbourhood being transmitted to neighbours Ni;
determining which information of the Sig_Neighbourhood is already known by each neighbour Ni;
deducting said information from the Sig_Neighbourhood to form a lightened Sig_Neighbourhood denoted by Sig_Neighbourhood_Transmitted[Ni], the method thereafter transmitting the Sig_Neighbourhood_Transmitted[Ni] in the steps of claim 14, and said method reconstituting the Sig_Neighbourhood(N) for each Sig_Neighbourhood_Transmitted received and for each of the topologies of the elementary networks, by executing the following steps:
calculation of a Cyclic Redundancy Check (CRC) on the reconstituted lightened Sig_Neighbourhood;
if the CRC is different from the CRC contained in the Sig_Neighbourhood_Transmitted, storing the Sig_Neighbourhood(N) in a Distant_Neighbourhood_Table table, and if there exists a Sig_Neighbourhood_Transmitted(N) in a Neighbourhood_Rebuilding_table table, erasing it;
NIN_TOPO_03/60, wherein with each receipt of a new elementary network topology originating from a TNA, for each Sig_Neighbourhood_Transmitted present in the Neighbourhood_Rebuilding_table table:
reconstructing the Sig_Neighbourhood by taking into account the data of the new elementary network topology;
calculating the CRC on the reconstituted Sig_Neighbourhood (N), wherein
if the value of this CRC is equal to the value of the CRC contained in the Sig_Neighbourhood_Transmitted, the method stores the Sig_Neighbourhood (N) reconstituted in the Distant_Neighbourhood_Table table and erases it from the Neighbourhood_Rebuilding_table table,
otherwise do nothing.

16. The method according to claim 1, wherein the module NIN_TOPO_07 for announcing the oriented characteristics of the logical links executes the following steps when there is transmission of the Sig_Neighbourhood from a local NIN to neighbour NINs: the method removes any item of information which depends on the orientation of the links and which relates to the oriented links of which it is destination.

17. The method according to claim 1, wherein the module NIN_TOPO_08 for marking the signalling data to manage non-sequencing in reception executes the following steps:
- in the case of a transmission of the Sig_Neighbourhood from a local NIN to neighbour NINs, the method includes a sequence index making it possible to detect the reboots of the nodes and the desequencings introduced by the network transmission;
- when the machines on which the method is installed are synchronized, said method uses a date as value of sequence index.

* * * * *